US008626377B2

(12) United States Patent
Larschan et al.

(10) Patent No.: US 8,626,377 B2
(45) **Date of Patent: *Jan. 7, 2014**

(54) METHOD FOR DATA COMMUNICATION BETWEEN A VEHICLE AND FUEL PUMP

(75) Inventors: Bradley R. Larschan, Germantown, TN (US); Alan C. Lesesky, Charlotte, NC (US); J. Richard Bishop, Jr., Woodstock, MD (US); James W. Welch, Germantown, TN (US)

(73) Assignee: Innovative Global Systems, LLC, Rock Hill, SC (US)

(*) Notice: Subject to any disclaimer, the term of this patent is extended or adjusted under 35 U.S.C. 154(b) by 13 days.

This patent is subject to a terminal disclaimer.

(21) Appl. No.: 13/385,624

(22) Filed: Feb. 27, 2012

(65) Prior Publication Data

US 2012/0166018 A1 Jun. 28, 2012

Related U.S. Application Data

(63) Continuation of application No. 13/134,928, filed on Jun. 21, 2011, now abandoned, which is a continuation of application No. 13/066,426, filed on Apr. 14, 2011, which is a continuation of application No. 12/931,437, filed on Feb. 1, 2011, now Pat. No. 8,032,277, which is a continuation of application No. 12/459,240, filed on Jun. 29, 2009, now Pat. No. 7,881,838, which is a continuation of application No. 11/299,762, filed on Dec. 13, 2005, now Pat. No. 7,555,378, which is a continuation of application No. 11/203,280, filed on Aug. 15, 2005, now Pat. No. 7,117,075.

(51) Int. Cl.
*G01M 17/00* (2006.01)
*G06F 19/00* (2011.01)

(52) U.S. Cl.
USPC .......................... 701/33.4; 701/123; 340/937

(58) Field of Classification Search
USPC .......... 701/35, 29.1, 36.2, 408, 468; 340/937, 340/431; 455/412.1; 705/16
See application file for complete search history.

(56) References Cited

U.S. PATENT DOCUMENTS

| | | | |
|---|---|---|---|
| 3,518,674 | A | 6/1970 | Moorehead et al. |
| 3,680,121 | A | 7/1972 | Anderson et al. |
| 3,714,650 | A | 1/1973 | Fuller et al. |
| 3,757,290 | A | 9/1973 | Ross et al. |
| 3,789,409 | A | 1/1974 | Easton |
| 3,848,254 | A | 11/1974 | Drebinger et al. |

(Continued)

FOREIGN PATENT DOCUMENTS

| | | |
|---|---|---|
| AU | 3767589 | 1/1990 |
| AU | 7750229 | 5/2001 |

(Continued)

OTHER PUBLICATIONS

U.S. Appl. No. 11/352,396, filed Feb. 13, 2006.

(Continued)

*Primary Examiner* — Tan Q Nguyen
(74) *Attorney, Agent, or Firm* — Schwartz Law Firm, P.C.

(57) ABSTRACT

A method for data communication between a vehicle and fuel pump includes storing vehicle operating data on an onboard recorder in the vehicle, and transmitting the vehicle operating data from the onboard recorder to the fuel pump. The vehicle operating data includes vehicle identification information.

15 Claims, 8 Drawing Sheets

(56) References Cited

U.S. PATENT DOCUMENTS 3,906,166 A 9/1975 Cooper et al.
4,053,893 A 10/1977 Boyer
4,059,689 A 11/1977 Struble et al.
4,067,061 A 1/1978 Juhasz
4,083,003 A 4/1978 Haemmig
4,107,689 A 8/1978 Jellinek
4,152,693 A 5/1979 Ashworth, Jr.
4,177,466 A 12/1979 Reagan
4,222,052 A 9/1980 Dunn
4,258,421 A 3/1981 Juhasz et al.
4,303,850 A 12/1981 Juhasz et al.
4,307,455 A 12/1981 Juhasz et al.
4,338,512 A 7/1982 Ludwig
4,428,052 A 1/1984 Robinson et al.
4,428,057 A 1/1984 Setliff et al.
4,435,711 A 3/1984 Ho et al.
4,445,118 A 4/1984 Taylor et al.
4,547,778 A 10/1985 Hinkle et al.
4,555,619 A 11/1985 Anderson
4,575,803 A 3/1986 Moore
4,590,569 A 5/1986 Rogoff et al.
4,630,292 A 12/1986 Juricich et al.
4,644,351 A 2/1987 Zabarsky et al.
4,651,157 A 3/1987 Gray et al.
4,654,879 A 3/1987 Goldman et al.
4,660,037 A 4/1987 Nakamura
4,670,905 A 6/1987 Sandvos et al.
4,677,429 A 6/1987 Glotzbach
4,685,061 A 8/1987 Whitaker
4,688,244 A 8/1987 Hannon et al.
4,700,374 A 10/1987 Bini
4,734,928 A 3/1988 Weiner et al.
4,737,978 A 4/1988 Burke et al.
4,740,792 A 4/1988 Sagey et al.
4,742,357 A 5/1988 Rackley
4,750,197 A 6/1988 Denekamp et al.
4,754,465 A 6/1988 Trimble
4,757,454 A 7/1988 Hisatake et al.
4,774,670 A 9/1988 Palmieri
4,775,999 A 10/1988 Williams
4,776,003 A 10/1988 Harris
4,787,053 A 11/1988 Moore
4,788,637 A 11/1988 Tamaru
4,791,571 A 12/1988 Takahashi et al.
4,791,572 A 12/1988 Green, III et al.
4,796,189 A 1/1989 Nakayama et al.
4,797,948 A 1/1989 Milliorn et al.
4,799,162 A 1/1989 Shinkawa et al.
4,804,937 A 2/1989 Barbiaux et al.
4,809,005 A 2/1989 Counselman, III
4,809,177 A 2/1989 Windle et al.
4,819,174 A 4/1989 Furuno et al.
4,833,477 A 5/1989 Tendler
4,833,701 A 5/1989 Comroe et al.
4,833,702 A 5/1989 Shitara et al.
4,843,575 A 6/1989 Crane
4,850,614 A 7/1989 Shanahan et al.
4,853,859 A 8/1989 Morita et al.
4,854,048 A 8/1989 Goulet
4,860,341 A 8/1989 D'Avello et al.
4,866,762 A 9/1989 Pintar
4,870,759 A 10/1989 Burton et al.
4,876,738 A 10/1989 Selby
4,884,208 A 11/1989 Marinelli et al.
4,891,650 A 1/1990 Sheffer
4,891,761 A 1/1990 Gray et al.
4,897,642 A 1/1990 DiLullo et al.
4,901,340 A 2/1990 Parker et al.
4,905,270 A 2/1990 Ono
4,907,290 A 3/1990 Crompton
4,908,629 A 3/1990 Apsell et al.
4,912,756 A 3/1990 Hop
4,914,686 A 4/1990 Hagar, III et al.
4,916,827 A 4/1990 Rayburn
4,926,331 A 5/1990 Windle et al.
4,939,652 A 7/1990 Steiner
4,945,570 A 7/1990 Gerson et al.
4,953,198 A 8/1990 Daly et al.
4,963,865 A 10/1990 Ichikawa et al.
4,993,062 A 2/1991 Dula et al.
4,998,291 A 3/1991 Marui et al.
5,003,317 A 3/1991 Gray et al.
5,008,814 A 4/1991 Mathur
5,014,206 A 5/1991 Scribner et al.
5,019,963 A 5/1991 Alderson et al.
5,021,961 A 6/1991 Ross et al.
5,025,253 A 6/1991 DiLullo et al.
5,032,845 A 7/1991 Velasco
5,043,736 A 8/1991 Darnell et al.
5,045,861 A 9/1991 Duffett-Smith
5,046,007 A 9/1991 McCrery et al.
5,046,082 A 9/1991 Zicker et al.
5,055,851 A 10/1991 Sheffer
5,058,201 A 10/1991 Ishii et al.
5,068,656 A 11/1991 Sutherland
5,090,050 A 2/1992 Heffernan
5,101,500 A 3/1992 Marui
5,119,102 A 6/1992 Barnard
5,121,126 A 6/1992 Clagett
5,121,325 A 6/1992 DeJonge
5,131,019 A 7/1992 Sheffer et al.
5,131,020 A 7/1992 Liebesny et al.
RE34,034 E 8/1992 O'Sullivan
5,142,281 A 8/1992 Park
5,142,654 A 8/1992 Sonberg et al.
5,155,490 A 10/1992 Spradley, Jr. et al.
5,155,847 A 10/1992 Kirouac et al.
5,159,625 A 10/1992 Zicker
5,166,694 A 11/1992 Russell et al.
5,172,321 A 12/1992 Ghaem et al.
5,191,529 A 3/1993 Ramsey et al.
5,208,756 A 5/1993 Song
5,223,844 A 6/1993 Mansell et al.
5,224,211 A 6/1993 Roe
5,225,842 A 7/1993 Brown et al.
5,229,947 A 7/1993 Ross et al.
5,235,633 A 8/1993 Dennison et al.
5,237,612 A 8/1993 Raith
5,243,529 A 9/1993 Kashiwazaki
5,247,440 A 9/1993 Capurka et al.
5,247,564 A 9/1993 Zicker
5,249,127 A 9/1993 Komatsu
5,252,982 A 10/1993 Frei
5,261,118 A 11/1993 Vanderspool, II et al.
5,270,936 A 12/1993 Fukushima et al.
5,276,729 A 1/1994 Higuchi et al.
5,293,163 A 3/1994 Kakihara et al.
5,297,191 A 3/1994 Gerszberg
5,297,192 A 3/1994 Gerszberg
5,299,132 A 3/1994 Wortham
5,303,163 A 4/1994 Ebaugh et al.
5,311,194 A 5/1994 Brown
5,323,322 A 6/1994 Mueller et al.
5,337,236 A 8/1994 Fogg et al.
5,347,274 A 9/1994 Hassett
5,359,528 A 10/1994 Haendel et al.
5,365,516 A 11/1994 Jandrell
5,392,458 A 2/1995 Sasuta et al.
5,394,136 A 2/1995 Lammers et al.
5,396,540 A 3/1995 Gooch
5,428,542 A 6/1995 Leiesveld
5,452,446 A 9/1995 Johnson
5,488,352 A 1/1996 Jasper
5,579,233 A 11/1996 Burns
5,586,130 A 12/1996 Doyle
5,587,890 A 12/1996 Happ et al.
5,594,425 A 1/1997 Ladner et al.
5,605,182 A * 2/1997 Oberrecht et al. .............. 141/94
5,612,875 A 3/1997 Haendel et al.
5,633,622 A 5/1997 Patterson
5,638,077 A 6/1997 Martin
5,648,768 A 7/1997 Bouve
5,659,470 A 8/1997 Goska et al.
5,677,667 A 10/1997 Lesesky et al.

(56) References Cited

U.S. PATENT DOCUMENTS 5,680,328 A 10/1997 Skorupski et al.
5,694,322 A 12/1997 Westerlage et al.
5,716,071 A 2/1998 Stanley et al.
5,721,678 A 2/1998 Widl
5,729,458 A 3/1998 Poppen
5,740,548 A 4/1998 Hudgens
5,742,229 A 4/1998 Smith
5,742,915 A 4/1998 Stafford
5,771,459 A 6/1998 Demery et al.
5,787,373 A 7/1998 Migues et al.
5,798,577 A 8/1998 Lesesky et al.
5,802,545 A 9/1998 Coverdill
5,815,071 A 9/1998 Doyle
5,848,365 A 12/1998 Coverdill
D403,659 S 1/1999 Lesesky
D404,170 S 1/1999 Lesesky
5,864,831 A 1/1999 Schuessler
5,880,958 A 3/1999 Helms et al.
5,884,473 A 3/1999 Noda et al.
5,886,331 A 3/1999 Lyons, Jr.
5,897,602 A 4/1999 Mizuta
5,905,433 A 5/1999 Wortham
5,913,180 A * 6/1999 Ryan ................................ 702/45
5,917,434 A 6/1999 Murphy
5,917,632 A 6/1999 Lesesky
5,919,239 A 7/1999 Fraker et al.
5,922,041 A 7/1999 Anderson
5,923,572 A * 7/1999 Pollock ......................... 700/282
5,924,075 A 7/1999 Kanemitsu
5,928,291 A 7/1999 Jenkins et al.
5,954,773 A 9/1999 Luper
5,963,129 A 10/1999 Warner
5,970,481 A 10/1999 Westerlage et al.
5,974,356 A 10/1999 Doyle et al.
5,987,378 A 11/1999 Schipper et al.
5,999,091 A 12/1999 Wortham
6,008,740 A 12/1999 Hopkins
6,025,563 A 2/2000 Lesesky et al.
6,026,384 A 2/2000 Poppen
6,026,868 A * 2/2000 Johnson, Jr. .................... 141/94
6,064,299 A 5/2000 Lesesky et al.
6,064,929 A 5/2000 Migues et al.
6,075,458 A 6/2000 Ladner et al.
6,085,805 A * 7/2000 Bates .............................. 141/94
6,087,965 A 7/2000 Murphy
6,088,650 A 7/2000 Schipper et al.
6,089,588 A 7/2000 Lesesky et al.
6,104,282 A 8/2000 Fragoso et al.
6,108,591 A 8/2000 Segal et al.
6,111,524 A 8/2000 Lesesky et al.
6,115,655 A 9/2000 Keith et al.
6,127,939 A 10/2000 Lesesky et al.
6,141,609 A 10/2000 Herdeg et al.
D434,006 S 11/2000 Lesesky et al.
6,150,793 A 11/2000 Lesesky et al.
6,151,549 A 11/2000 Andrews et al.
6,167,333 A 12/2000 Gehlot
6,181,995 B1 1/2001 Luper et al.
6,185,484 B1 2/2001 Rhinehart
6,185,501 B1 2/2001 Smith et al.
6,193,154 B1 * 2/2001 Phillips et al. ................ 235/381
6,195,023 B1 2/2001 Walsh et al.
6,215,395 B1 4/2001 Slaughter et al.
6,226,577 B1 5/2001 Yeo
6,253,129 B1 6/2001 Jenkins et al.
6,254,201 B1 7/2001 Lesesky et al.
6,259,988 B1 7/2001 Galkowski et al.
6,278,935 B1 8/2001 Kaplan et al.
6,285,953 B1 9/2001 Harrison et al.
6,317,668 B1 11/2001 Thibault
6,331,825 B1 12/2001 Ladner et al.
6,351,695 B1 2/2002 Weiss
6,352,137 B1 3/2002 Stegall et al.
6,353,796 B1 3/2002 Schipper et al.
6,359,570 B1 3/2002 Adcox et al.
6,378,959 B2 4/2002 Lesesky et al.
6,393,346 B1 5/2002 Keith et al.
6,411,203 B1 6/2002 Lesesky et al.
6,411,206 B1 6/2002 Weant et al.
6,421,590 B2 7/2002 Thibault
6,424,893 B1 7/2002 Byrene et al.
6,453,731 B1 9/2002 Yaegashi
6,459,367 B1 10/2002 Green et al.
6,496,377 B1 12/2002 Happ et al.
6,501,375 B1 12/2002 Weant et al.
6,502,035 B2 12/2002 Levine
6,519,529 B2 2/2003 Doyle
6,522,265 B1 2/2003 Hillman et al.
6,525,672 B2 2/2003 Chainer et al.
6,526,341 B1 2/2003 Bird et al.
6,533,465 B1 3/2003 Lesesky et al.
6,571,151 B1 * 5/2003 Leatherman .................. 700/282
6,571,168 B1 5/2003 Murphy et al.
6,582,033 B2 6/2003 Lesesky et al.
6,604,038 B1 8/2003 Lesesky et al.
6,608,554 B2 8/2003 Lesesky et al.
6,611,686 B1 8/2003 Smith et al.
6,650,224 B1 11/2003 Weigl et al.
6,671,646 B2 12/2003 Manegold et al.
6,677,854 B2 1/2004 Dix
6,681,987 B1 1/2004 Ford
6,690,294 B1 2/2004 Zierden
6,697,735 B2 2/2004 Doyle
6,714,857 B2 * 3/2004 Kapolka et al. ............... 701/123
6,744,352 B2 6/2004 Lesesky et al.
6,753,771 B2 6/2004 Lesesky
6,799,814 B2 10/2004 Lesesky et al.
6,804,626 B2 10/2004 Manegold et al.
6,807,481 B1 10/2004 Gastelum
6,816,090 B2 11/2004 Teckchandani et al.
6,862,521 B1 3/2005 Fox
6,892,131 B2 5/2005 Coffee et al.
6,894,606 B2 5/2005 Forbes et al.
6,909,398 B2 6/2005 Knockeart et al.
6,946,953 B2 9/2005 Lesesky et al.
7,015,800 B2 3/2006 Lesesky et al.
7,040,435 B1 5/2006 Lesesky et al.
7,102,494 B2 9/2006 Lesesky et al.
7,117,075 B1 10/2006 Larschan et al.
7,117,121 B2 10/2006 Brinton et al.
7,289,877 B2 * 10/2007 Wilson .......................... 700/232
7,379,897 B2 * 5/2008 Pinkus ............................ 705/16
7,543,611 B2 * 6/2009 Kallberg ........................... 141/1
7,555,378 B2 6/2009 Larschan et al.
7,881,838 B2 2/2011 Larschan et al.
2001/0018628 A1 8/2001 Jenkins et al.
2001/0020204 A1 9/2001 Runyon et al.
2001/0040408 A1 11/2001 Lesesky et al.
2002/0030403 A1 3/2002 Lesesky et al.
2002/0035421 A1 3/2002 Warkentin
2002/0060625 A1 5/2002 Lesesky et al.
2002/0133275 A1 9/2002 Thibault
2002/0165694 A1 11/2002 Chene et al.
2002/0183905 A1 12/2002 Maeda et al.
2003/0036823 A1 2/2003 Mahvi
2003/0097208 A1 5/2003 Doyle
2003/0100305 A1 5/2003 Parisi
2003/0204362 A1 10/2003 Beresford et al.
2003/0218847 A1 11/2003 Lesesky et al.
2004/0004539 A1 1/2004 Collins
2004/0073468 A1 4/2004 Vyas et al.
2004/0157650 A1 8/2004 Wissinger et al.
2004/0233284 A1 11/2004 Lesesky et al.
2004/0243285 A1 12/2004 Gounder
2005/0016787 A1 1/2005 Lesesky et al.
2005/0060070 A1 3/2005 Kapolka et al.
2005/0099279 A1 5/2005 Forbes et al.
2005/0190045 A1 9/2005 Lesesky et al.
2005/0203816 A1 9/2005 Monsor et al.
2005/0280514 A1 12/2005 Doan
2006/0095175 A1 5/2006 deWaal et al.
2006/0095199 A1 5/2006 Lagassey

(56) References Cited

U.S. PATENT DOCUMENTS

| | | | |
|---|---|---|---|
| 2006/0192427 A1 | 8/2006 | Lesesky et al. |
| 2006/0212195 A1 | 9/2006 | Veith et al. |
| 2006/0213731 A1 | 9/2006 | Lesesky et al. |

FOREIGN PATENT DOCUMENTS

| | | |
|---|---|---|
| CA | 2 391 155 | 5/2001 |
| DE | 35 16 357 | 6/1994 |
| DE | 44 04 800 | 8/1995 |
| DE | 44 23 328 | 1/1996 |
| DE | 197 44 419 | 4/1999 |
| DE | 100 55 287 | 5/2002 |
| EP | 0 242 099 | 10/1987 |
| EP | 0 367 935 | 5/1990 |
| EP | 0 290 725 | 8/1993 |
| EP | 0 744 322 A2 | 5/1996 |
| EP | 0 802 082 B1 | 2/1997 |
| EP | 1 128 333 | 8/2001 |
| EP | 1 419 935 | 5/2004 |
| FR | 2 717 595 | 9/1995 |
| GB | 2 193 861 | 2/1988 |
| GB | 2 221 113 | 1/1990 |
| JP | 59-161941 | 9/1984 |
| JP | 63-175537 | 7/1988 |
| JP | 63-219238 | 9/1988 |
| JP | 1-1226226 | 9/1989 |
| WO | 89/04035 | 5/1989 |
| WO | 89/12835 | 12/1989 |
| WO | 93/22848 | 11/1993 |
| WO | 97/17232 | 5/1997 |
| WO | 97/28988 | 8/1997 |
| WO | 98/34812 | 8/1998 |
| WO | 98/37432 | 8/1998 |
| WO | 99/06987 | 2/1999 |
| WO | 99/21383 | 4/1999 |
| WO | 99/35009 | 7/1999 |
| WO | 01/36234 | 5/2001 |

OTHER PUBLICATIONS

U.S. Appl. No. 11/352,411, filed Feb. 13, 2006.
U.S. Appl. No. 11/352,409, filed Feb. 13, 2006.
U.S. Appl. No. 11/352,410, filed Feb. 13, 2006.
U.S. Appl. No. 11/352,395, filed Feb. 13, 2006.
U.S. Appl. No. 12/931,437, filed Feb. 1, 2011.
U.S. Appl. No. 13/066,426, filed Apr. 14, 2011.
U.S. Appl. No. 13/134,928, filed Jun. 21, 2011.
Alsip, D.H., J.M. Butler, and J.T. Radice, "Implementation of the U.S. Coast Guard's Differential GPS Navigation Service", U.S. Coast Guard Headquarters, Office of Navigation Safety and Waterway Services, Radionavigation Division, Jun. 28, 1993, pp. 1-10.
"Appendix B, The 1991 Radionavigation User Conference," Department of Transportation, Date Unknwn, pp. 1-2.
Burtis, Don, "CDPD—A Bandwith Optimization Technique for Cellular Telephones," Computer Design's OBM Integration, May 1994, pp. 19-20.
DeSadaba, R., "Personal Communications in the Intelligent Network", British Telecommunications Engineering, vol. 9, Aug. 1990, pp. 80-83.
"GPS Facts & Figures" Brochure, U.S. Department of Transportation, United States Coast Guard, May 1993.
"GPS Navstar Global Positioning System User's Overview—YEE-82-009D", Navstar Global Positioning System Joint Program Office, Mar. 1991, pp. 1-164.
Ladendof, Kirk, "First in Flight—Using State-of-the-Art Technology, Austin—Basad Arrowsmith Technologies Establishes Itself as a Major Player in Nascent Technology-Supplier Market", Austin America-Statemsan, Jan. 30, 1995, 3 pages.
"Motorola GPS Technical Reference Manual", Oct. 1993, Manual Cover, Title Page.
Ott, Gary D., "Vehicle Location in Cellular Mobile Radio Systems", IEEE, vol. VT-26, No. 1, Feb. 1997, pp. 43-46.
Reynolds, James C. et al., "GPS-Based Vessel Position Monitoring and Display System", IEEE, 1990, pp. 601-607.
Schlechte, Gene L., LCDR, "U.S. Coast Guard Bulletin Board System Document 'Design.Txt'—Design Process for the United Sates Coast Guard's Differntial GPS Navigation Services," U.S. Coast Guard, U.S. Coasst Guard Omega Navigation System Center, Date Unknown, pp. 1-21.
"Trimpack" Brochure, TrimbleNavigation, date unknown, 1 page.
Tripmaster: Federal & State Compliance; http://www.tripmaster.com/html/solutions/Solutions__subpages/tm__fed__state__comp.html; Mar. 5, 2005.
Tripmaster: Products; http://www.tripmaster.com/html/products/tm__products.html; Mar. 5, 2005.
Tripmaster Corporation; http://www.tripmaster.com/html/products/sub__pages/tm__wireless.html; Mar. 5, 2005.
Tripmaster: DDT II; http://www.tripmaster.com/html/products/sub__pages/tm__terminal.htm; Mar. 5, 2005.
Tripmaster: Sync; http://www.tripmaster.com/html/products/subpages/tm__sync.htm; Mar. 5, 2005.
Tripmaster:: JJ Keller Fuel Tax Master; http://www.tripmaster.com/html/products/sub__pages/tm__taxmaster..htm; Mar. 5, 2005.
Tripmaster::: Tripmaster's MobilecomJ; http://www.tripmaster.com/html/products/sub__pages/tm__mobilecom.htm; Mar. 5, 2005.
"U.S. Coast Guard Differential GPS" Brochure, U.S. Department of Transportation, United States Coast Guard, May 1993.
On-Board Recorders: Literature and Technology Review, FMCSA-2004-189403.
"Electronic On-Board Recorders for Hours-of-Service Compliance," Letter from ATC Leasing Company to U.S. Department of Transportation, Nov. 11, 2004, FMCSA-2004-18940-324.
Comments of the Gases and Welding Distributors Association, Docket No. FMCSA-2004-18940, 49 CFR Part 395, Electronic On-Board Recorders for Hours-of-Service Compliance, Nov. 30, 2004, pp. 1-4.
"FMCSA ANPRM on Electronic On-Board Recorders (EOBRs)," Letter from Truckload Carrier's Association to U.S. Department of Transportation, Docket No. FMCSA-2004-18940.
Electronic Onboard Recorders for Hours-of-Service Compliance, Peoplenet, DMS Docket No. FMCSA-2004-18940, Nov. 2004, pp. 1-20.
"Electronic On-Board Recorders for Hours-of-Service Compliance, Advance Notice of Proposed Rulemaking, 69 FR 53386, Sep. 1, 2004," Letter from Advocates for Highway and Auto Safety to U.S. Department of Transportation, Docket No. FMCSA-2004-18940, Nov. 30, 2004.
"Electronic On-Board Recorders for Hour-of-Service Compliance," Comments submitted on behalf of Commercial Vehicle Safety Alliance, Before the U.S. Department of Transportation, Federal Motor Carrier Safety Administration, Docket No. FMCSA-2004-18940, pp. 1-11, Nov. 30, 2004.
"Revised Submission of the Federal Motor Carriers Administration in Response to Advance Notice of Proposed Rule Making regarding Electronic On-Board Recorders (EOBR)," IBM Business Consulting Services—Public Sector, FMCSA-04-18940-334.
Letter from Department of California Highway Patrol to U.S. Department of Transportation, Docket No. FMCSA-2004-18940-19, Nov. 23, 2004.
"Electronic On-Board Recorders for Hours-of-Service Compliance," Letter from Siemens VDO Automotive to U.S. Department of Transportation, Docket No. FMSCA-2004-18940.
Letter from U.S. Department of Transportation to Adam T. Wegel, Delphi Corporation, Docket No. FMCSA-2004-18940-1, MC-PSV, Dec. 1, 2003.
Beal, Joel, "Tripmaster Corporation Comments on Advanced Notice of Proposed Rulemaking Published in Docket No. 18940, RIN 2123-AA89," Docket No. FMCSA-2004-17286, Federal Motor Carrier Safety Administration, U.S. Department of Transportation, Nov. 30, 2004, pp. 1-27.
Campbell et al., Kenneth, "Electronic Recorder Study," Final Report, The University of Michigan Transportation Research Institute, Docket No. FMCSA-2004-18940-7, Jun. 1998.
Witty, Eric, Comments on ANPRM, DOT DMS Docket No. FMCSA-2004-17286, XATA Corporation, Oct. 25, 2004, pp. 1-18.

(56) References Cited

OTHER PUBLICATIONS

Tomlinson, William, "Response to Advanced Notice of Proposed Rule Making associated with Costs and Benefits of Electronic On-Board Recorders (EOBR)," Oct. 21, 2004.
"Commercial Vehicle: Operational Test Project Eyes Satellite Location for State Fee Payment," 02711212/9, The Gale Group, ISSN: 1054-2647, Feb. 1, 1993.
"Commercial Vehicle: Rockwell Onboard Unit Passes "Validity Test" in AMASCOT Project," 03471184/9, The Gale Group, ISSN: 1054-2647, Jul. 18, 1994.
"NPRM Request for Comments on Electronic On-Board Recorders [EOBR] for Hours-of-Service Compliance," White Paper submitted to Department of Transport Federal Motor Carrier Safety Administration, 49 CFR Part 395, FMCSA-2004-18940, RIN-2126-AA89, TACS Transportation Advisory & Consulting Service, Nov. 2004.
"Comments of the Owner-Operator Independent Drivers Association, Inc.," In Response to an Advance Notice of Proposed Rulemaking Request for Comments, Electronic On-Board Records for Hours of Service Compliance, Before the Federal Motor Carrier Safety Administration U.S. Department of Transportation, Docket No. FMCSA-2004-18940, Nov. 30, 2004.
"Comments on Federal Motor Carrier Safety Administration (FMCSA) Advanced Notice of Proposed Rulemaking and Request for Comments Regarding On-Board Recorders," Docket No. FMCSA-2004-18940, Nov. 30, 2004, pp. 1-15.
MacCleery, Laura, Comments in Response to Xora, Inc., Application for Exemption From Design Requirements for Automatic On-Board Recording Devices (AOBR's), Docket No. FMCSA-2005-21338, Jul. 8, 2005.
"Comments of the Owner-Operator Independent Drivers Association, Inc.," In Response to a Notice of Application for Exemption; Request for Comments, Docket No. FMCSA-2005-21338-11, Jun. 30, 2005.
Application for Exemption by Xora Inc, Docket No. FMCSA-2005-21338-5, Jun. 16, 2005, pp. 1-24.
IFTA Procedures Manual, Jan. 1996, Revised Jul. 2000, pp. 1-35.
"Federal Register Response to Electronic On-Board Recorders for Hours-of-Service Compliance," IACP Highway Safety Committee, Docket No. FMCSA-2004-18940, pp. 1-2.
Federal Motor Carrier Safety Administration, Hours of Service (HOS) Research and Analysis Modules, Docket No. FMCSA-2004-18940-2, Jan. 21, 2003.
Guerrero, Thelma, "Oregon to Use Facial Scan for CDL Licensing," American Trucking Associations, Inc., Sep. 29, 2005.
Guerrero, Thelma, "Diesel, Gas Prices Decline," Transport Topics, Sep. 26, 2005.
AMASCOT: Automated Mileage and Stateline Crossing Operational Test, Final Report, Iowa State University, Center for Transportation Research and Education, May 1, 1996.
"Electronic On-Board Recorders for Hours-of-Service Compliance", Federal Register, vol. 69, No. 169, Sep. 1, 2004, Proposed Rules, 49 CFR Part 395, Docket No. FMCSA-2004-18940, RIN-2126-AA89.
Notice of Application for Exemption, Supplemental Comments of Xora, Docket No. FMCSA-2005-21338
Guidelines for Electronic On-Board Recorders ("EOBR"), TMC Recommended Practice, Proposed RP1219(T), Working Draft Version-6 © 2005-TMC/ATA, Updated Sep. 18, 2005, pp. 1-24.
FuelMaster: Fuel Management Systems, http://www.syntech-fuelmaster.com/products/aim2/aim2.asp, reprinted on Mar. 2, 2007.
Detroit Diesel Corp, "Infrared Information System (IRIS)," 2002.
James L. Wayman, "Biometrics Identification Standards Research", College of Engineering, San Jose State University, FHWA Contract DTFH61-95-C-00165, vol. I, Revision 2, Dec. 1997, (93 pages).
Surface Vehicle Standard, "Power Line Carrier Commnunications for Commercial Vehicles", SAE International J2497, Oct. 2002 (17 pages).
Surface Vehicle Recommended Practice, "Joint SAE/TMC Electronic Data Interchange Between Microcomputer Systems in Heavy-Duty Vehicle Applications", SAE International J1587, Revised Jul. 1998 (196 pages).
Surface Vehicle Recommended Practice, "Recommended Practice for a Serial Control and Communications Vehicle Network," SAE International J1939, Revised 2005 (257 pages).
Qualcomm Incoporated; OmniTracs® Customer Service Bulletin 0017; Oct. 4, 1990; pp. 1-6.
Vehicle Electronic Systems for the 1990s; Kopec, James W.; Presented to S.12 Mini-Tech session, TMC '91; pp. 1-11.
Qualcomm OmniTracs System; J1708/J1587 Application Document; Feb. 6, 1995; pp. 1-7.
Technical Overview; OmniTracs®; Sep. 1992; pp. 1-22.
SAE The Engineering Society for Advancing Mobility Land Sea Air and Space; A product of the Cooperative Engineering Program; SAE 1708 JUN87; "Truck and Bus Practice"; Jun. 1987; pp. 1-12.
Vesplex; "Proposed Industry Standard for Tractor/Trailer Communications"; Lesesky, Alan C., Vehicle Enhancement Systems, Inc. (VES); Sep. 1, 1993; pp. 1-15.
Technical Overview; OmniTracs®; Apr. 1995; pp. 1-21.
SensorTracs Installation Guide; OmniTracs; Jun. 1992; pp. 1-56.
"Communications Revolution in Trucking"; Cross, Rich; Commerical Carrier Journal Mar. 1991; pp. 1-67.
SensorTracs Installation Guide; OmniTracs; Feb. 1992; pp. 1-58.
SensorTracs Installation Guide; OmniTracs; Jun. 1993; pp. 1-55.

* cited by examiner

METHOD FOR DATA COMMUNICATION BETWEEN A VEHICLE AND FUEL PUMP

TECHNICAL FIELD

The invention relates broadly to a method for data communication between a vehicle and fuel pump.

BACKGROUND

One of the largest government-mandated paperwork and cost burdens imposed upon any segment of private industry are the reporting requirements relating to commercial motor vehicles (CMV). Commercial Motor Vehicles (CMV) and their respective drivers and carriers are required by various federal regulations and international agreements to comply with rules governing the safe operation of the vehicles and the reporting of fuel taxes. In 1937, the federal government imposed hours-of-service (HOS) regulations upon commercial motor vehicle drivers operating commercial vehicles in the domestic motor carrier industry to ensure highway safety. Under direction of Congress, the Federal Motor Carrier Safety Administration (FMCSA) has scrutinized and periodically revised the hours-of-service regulations to aid in the reduction of driver fatigue and sleep disorder related incidents on the nation's highways.

Federal regulations relating to the safe operation of Commercial Motor Vehicles (CMV) are defined in 49 CFR Part 395 and 49 CFR Part 390.5, the entirety of each of which are incorporated by reference. One way in which safety is promoted in the hours-of-service regulations is to prohibit drivers from operating or being forced to operate their vehicles more than a specified amount of time between mandatory off-duty periods. In 1987, the FMCSA permitted carriers the flexibility of using an automatic on-board recording devices (AOBRD) instead of the traditional reporting method involving manual data entry and filing of reports by the CMV drivers and/or their carriers.

The International Fuel Tax Agreement (IFTA) is an agreement among jurisdictions in the United States, Mexico and Canada that simplifies the reporting of fuel-use tax for diesel, gasoline, gasohol, propane, and natural gas consumption by commercial motor vehicles. Fuel-use tax is included in the purchase price of the fuel and then later redistributed to those jurisdictions where the vehicle actually was driven while consuming fuel. For example, a driver of a CMV may purchase diesel fuel in the state of Texas and travel outside of Texas to a neighboring state, e.g., Louisiana, using the same diesel fuel purchased in Texas. IFTA requires carriers to report actual mileage driven in each jurisdiction so that the actual taxes collected may be later apportioned to Texas and Louisiana in accordance with actual vehicle operation. Each day, some 6.4 million drivers complete HOS logs to track driver compliance with HOS regulations. In addition, fuel tax logs are created daily for some 10 million trucks. The cost of compliance with these reporting requirements is extraordinarily burdensome. It is estimated that the annual cost of complying with reporting requirements using paper logs is approximately $2,000.00 per driver and $2,000.00 per commercial motor vehicle. This results in a paper log compliance cost of $31 billion dollars per year imposed upon private industry.

SUMMARY

In one aspect, a method for logging and reporting driver activity and vehicle operation includes identifying a driver of a vehicle and recording operating data. The operating data is recorded with an on-board recorder that is hard-wired to a data bus, for example, an engine control module, of the vehicle, coupled to a vehicle mileage sensing system, and linked to a global navigation satellite system. The operating data includes mileage obtained from at least one of the vehicle mileage sensing system and the vehicle data bus; engine use, time, and date obtained from the vehicle data bus; and location, time, and date obtained from the global navigation satellite system. The method includes recording a duty status of the driver. The duty status includes (a) off duty status, (b) sleeper berth status, (c) driving-on duty status, and (d) not driving-on duty status.

The method further includes creating an hours of service log from time, date, and duty status, the hours of service log including a change in duty status of the driver, time and date the change occurred, hours within each duty status, total hours driven today, total hours on duty for seven days, and total hours on duty for eight days; creating a fuel tax log from mileage obtained from the vehicle mileage sensing system, location obtained from the global navigation satellite system, time obtained from at least one of the vehicle data bus and the global navigation satellite system, and date obtained from at least one of the vehicle data bus and the global navigation satellite system, the fuel tax log including miles traveled between periodic recording intervals, and location, time, and date recorded at each periodic recording interval; comparing the driver's hours of service log to an applicable requirement, for example, law or regulation; indicating to the driver with the on-board recorder whether the driver is in-compliance or out-of-compliance with the applicable requirement; automatically uploading the hours of service log and the fuel tax log to a receiver external to the vehicle using a wireless telecommunications network; and emitting a compliance signal representative of whether the driver is in-compliance or out-of-compliance with the applicable requirement to a second receiver external to the vehicle and under control of authorities.

Embodiments of this aspect may include one or more of the following features.

The method includes identifying the driver of the vehicle by interfacing with a portable memory device, and importing a driver's hours of service log through the portable memory device or the wireless network. The portable memory device is, for example, a smart card or contact memory button. The method further includes verifying the identity of the driver of the vehicle using, for example, biometric verification, and enabling the vehicle to be started, moved, or engine idled in response to identifying the driver of the vehicle.

Recording operating data includes automatically recording the mileage from the vehicle mileage sensing system; the mileage, engine use, time, and date obtained from the vehicle data bus; and the location, time, and date obtained from the global navigation satellite system. Recording the duty status can include automatically determining a change in the duty status and at least one of the time, date and location of the change in the duty status from the operating data. Recording the duty status includes logging a change in the duty, status from a manual input by the driver.

The fuel tax log is used to create an IFTA (International Fuel Tax Agreement) compliant fuel tax report. The method includes manually inputting an indication of a border crossing.

When team driving, the method includes logging the duty status of a first driver of the vehicle with the on-board recorder; identifying a next driver of the vehicle with the on-board recorder; logging the duty status of the first driver and the next driver of the vehicle with the on-board recorder; and importing data for an hours of service log for the next driver into the on-board recorder from at least one of a portable memory device and a wireless telecommunications network. The fuel tax log can be created for a single vehicle having the first driver and the second driver.

The method includes calibrating mileage received from the vehicle mileage sensing system using data received from the global navigation satellite system or using vehicle tire size, and providing mileage from the recorder to an odometer display and to the vehicle data bus.

An exceptions report can be created from the comparison of the driver's hours of service log to the applicable requirement, and a cause of being out-of-compliance displayed to the driver.

The method includes encrypting the operating data, the hours of service log, the fuel tax log, and the compliance signal emitted from the recorder to ensure data integrity.

Operating data can be modified by a driver input and/or by a fleet carrier input, and any alterations of operating data recorded with a track changes function of the on-board recorder and/or on the host server.

The hours of service log can be displayed, for example, inside or outside the vehicle on an external display, as a graphical grid.

Automatically uploading includes uploading over a pager connection, a cellular telephone connection, a wide area network connection, an infrared connection, a radio connection, and/or a satellite connection. Automatically uploading includes uploading during an off-peak operating period, for example between 1:00 am and 5:00 am and/or on a weekend, for a wireless telecommunications network. Automatically uploading includes attempting to upload at least daily first over a least expensive connection and, if unsuccessful, then over at least one next least expensive connection, and uploading over a satellite connection when successive daily uploads are unsuccessful. Automatically uploading includes attempting to upload at least daily first over a predetermined wireless telecommunications network connection and, if unsuccessful, then over another predetermined wireless telecommunications network. Automatic uploading is an uploading of the current day, previous days, or day prior to the previous day hours of service and/or fuel tax logs.

The method includes uploading to the second receiver external to the vehicle when a compliance status check is requested by law enforcement, and/or when the vehicle is within a predetermined range of the second receiver. The second receiver is located, for example, on a handheld device, along a highway, at a weigh station, or within a law enforcement vehicle. The compliance signal is uploaded, for example, through a wired or wireless connection connected to a data port inside or outside of the vehicle.

The hours of service log is output to, for example, a display on the on-board recorder, a display on an external display device, the second receiver, or a wired connection connected to a data port inside or outside of the vehicle. The output of the hours of service log occurs responsive to a request from, for example, the driver, a fleet carrier, or the authorities. A data transfer and storage device can be placed in communication with the on-board recorder; and the hours of service log, fuel tax log, and the compliance signal uploaded to the data transfer and storage device.

The receiver to which the logs are automatically uploaded is, for example, a host server, and the fuel tax logs are uploaded from the host server to an external server that creates and files fuel tax reports.

In particular embodiments, the method may include notifying the driver if a particular event occurs, for example, notifying the driver to log into the recorder if the vehicle moves and the driver has not logged in, emitting an out-of-compliance signal if the driver is not logged in within a predetermined period, notifying the driver to log operating data on a paper log if the recorder is malfunctioning, and notifying a driver when the driver is nearing the end of an hours of service parameter. The driver can be notified by, for example, a text message, a visual indicator, and/or an audible signal. Compliance can be indicated by red, yellow, and green lights. A light on the recorder can be flashed when the driver is within a first predetermined time period of the end of the parameter, and another light on the recorder flashed when the driver is within another predetermined time period of the end of the parameter. The carrier can also be notified when the driver is nearing the end of a parameter. The method can also include emitting a signal indicating whether the recorder is present.

The method further includes, for example, the driver certifying the hours of service log prior to the automatic upload, and initiating a self-diagnostic function on the recorder upon a predetermined event. The predetermined event is at least one of a vehicle start, once in a 24-hour cycle, upon demand by law enforcement, and upon demand by the driver.

According to another aspect, a method for logging and reporting driver activity and vehicle operation includes recording only the following operating data mileage obtained from at least one of the vehicle mileage sensing system and the vehicle data bus; engine use, time, and date obtained from the vehicle data bus; and location, time, and date obtained from the global navigation satellite system.

According to another aspect, an on-board recorder for logging and reporting driver activity and vehicle operation includes a memory device configured to store operating data; a power supply; a first interface configured to connect to a vehicle mileage sensing system; a second interface configured to connect to an vehicle data bus of the vehicle; a receiver configured to link with a global navigation satellite system; at least one data portal configured to upload data from the memory device to a receiver external to the vehicle using a wireless telecommunications network, and supporting a connection with a receiver external to the vehicle and under control of authorities; a driver interface configured to record driver identification information input by a driver of the vehicle and duty status input by the driver; a processor operatively connected to the memory device for processing encoded instructions, recording operating data, and creating an hours of service log, a fuel tax log, and determining whether the driver is in compliance with an applicable requirement; and a display.

According to another aspect, a system for logging and reporting driver activity and vehicle operation includes an on-board recorder; wired connection between the on-board recorder and the vehicle data bus; a first server connected with the vehicle through the wireless telecommunications network, the on-board recorder being configured to automatically download the hours of service log, the fuel tax log, and the compliance signal; and a second server connected with the first server and configured to receive the fuel tax log, the second server including a computer readable media encoded with one or more computer programs for filing fuel tax reports based on the fuel tax log.

According to another aspect, a device for logging and reporting driver activity and vehicle operation includes one or more of the following means: means for identifying a driver of a vehicle and recording operating data; means for recording a duty status of the driver; means for creating an hours of service log; means for creating a fuel tax log; means for comparing the driver's hours of service log to an applicable requirement; means for indicating to the driver with the on-board recorder whether the driver is in-compliance or out-of-compliance with the applicable requirement; means for automatically uploading the hours of service log and the fuel tax log to a receiver external to the vehicle; and means for emitting a compliance signal representative of whether the driver is in-compliance or out-of-compliance with the applicable governmental reporting requirement to a second receiver external to the vehicle and under control of authorities.

According to another aspect, a method includes one or more of the following and/or an apparatus includes one or more of the following means for: identifying one or more drivers of a vehicle; verifying the identity of the one or more drivers by at least one of biometric and visual means; determining driver hours of service for more than one driver concurrently; recording driver hours of service for more than one driver concurrently; uploading data via a least cost method over a wireless telecommunications network; uploading through the recorder, via a wireless telecommunications network, driver identity, whether or not verified; identifying a driver, tying identity information to a driver record, determining driver hours of service, recording hours of service, uploading hours of service via a wireless telecommunications network, and optionally verifying identity information and optionally tying verification information to the driver record.

According to another aspect, a method includes one or more of the following and/or an apparatus includes one or more of the following means for: determining miles driven by a vehicle; recording miles driven by a vehicle; determining at least one of present and past location of a vehicle within a jurisdiction; determining at least one of present and past location of a vehicle between jurisdictions; determining border crossings between jurisdictions; recording at least one of present and past location of a vehicle within a jurisdiction; recording at least one of present and past location of a vehicle within two or more jurisdictions; recording border crossings between jurisdictions; uploading via a wireless telecommunications network at least one of present and past location of a vehicle within a jurisdiction; uploading via a wireless telecommunications network at least one of present and past location of a vehicle within two or more jurisdictions; uploading via a wireless telecommunications network border crossings between jurisdictions; and uploading via a least cost method over a wireless telecommunications network at least one of present and past location of a vehicle within a jurisdiction, at least one of present and past location of a vehicle within two or more jurisdictions, and/or border crossings between jurisdictions.

According to another aspect, a method includes one or more of the following and/or an apparatus includes one or more of the following means for: calculating, for example, periodically, when interrogated by authorities, or continuously, whether or not a driver is driving within parameters established by at least one of law(s) or regulation(s); wirelessly notifying, signaling, alerting or informing authorities that a driver is not in compliance with applicable hours of service laws or regulations; transmitting driver hours of service data to law enforcement via at least one of a wired connection, portable memory device and wirelessly, displaying data residing on the recorder via at least one of a wired connection, portable memory device and wirelessly, displaying remaining time for driver hours of service in at least one duty status generated from the recorder; exchanging data between the recorder and devices used to pump fuel into a vehicle; determining a driver's hours of service in compliance with home country and country of operation laws and regulations determining more than one driver's hours of service concurrently in compliance with home country and country of operation laws and regulations; and displaying hours of service data in any one or more languages.

According to another aspect, a method includes one or more of the following and/or an apparatus includes one or more of the following means for: identifying the location at which a trailer is at least one of tethered or un-tethered from a vehicle; recording the location at which a trailer is at least one of tethered or un-tethered from a vehicle; uploading the location at which a trailer is at least one of tethered or un-tethered from a vehicle; identifying the location of a trailer tethered to a vehicle; recording the location of a trailer tethered to a vehicle; and uploading the location of a trailer tethered to a vehicle.

The details of one or more embodiments of the invention are set forth in the accompanying drawings and the description below. Other features, objects, and advantages of the invention will be apparent from the description and drawings, and from the claims.

DETAILED DESCRIPTION

The systems, methods and apparatus described provide the capability of logging driver activity and vehicle operating data, creating reports from the data containing information required to comply with HOS regulations and IFTA fuel tax reporting, and emitting a signal indicating whether the driver is in-compliance or out-of-compliance with applicable HOS laws or regulations.

Figure 1:
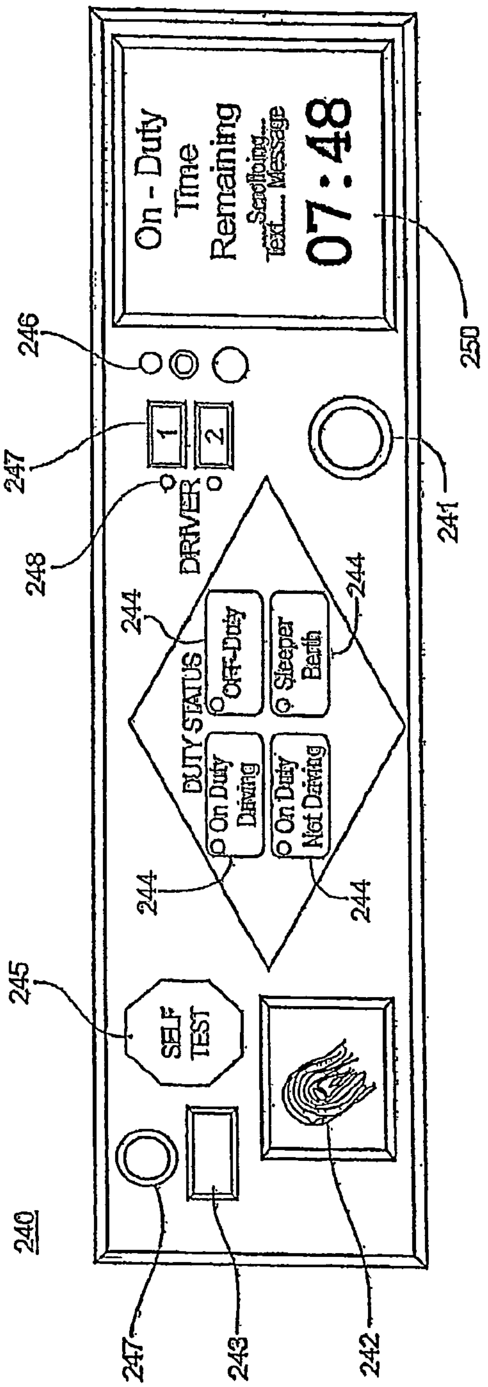
FIG. 1 is a front view of a display of an on-board recorder.
Figure 2:
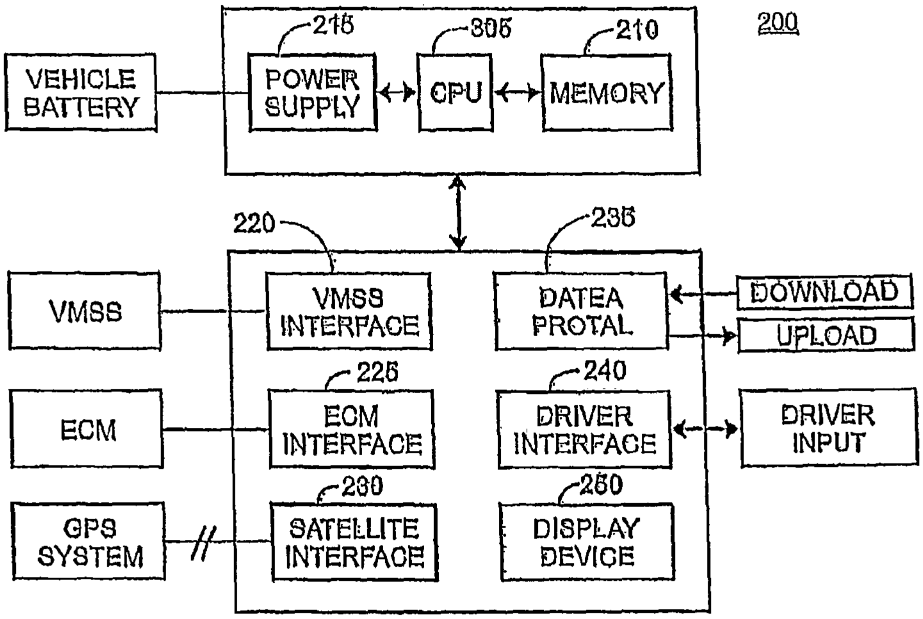
FIG. 2 is a schematic view of the on-board recorder.

Referring to FIGS. 1 and 2, an on-board recorder 200 includes various inputs and outputs for interfacing with a driver of the vehicle, a host server (typically located at the fleet carrier), authorities, a vehicle mileage sensing system, for example, a speed sensor (such as a magnetic pickup) and vehicle odometer sensor display of the vehicle, a data bus of the vehicle, for example, the vehicle engine control module (ECM), and a global navigation satellite system. The driver communicates with recorder 200 via a driver interface 240 permitting data input and interaction with the driver through the use of a portable memory device reader 241, and duty status buttons 244.

Recorder 200 includes a front panel 240 having a display screen 250, for example, a scrolling text message bar, for displaying text messages to the driver, a portable memory device reader 241, such as a contact memory button reader or smart card reader, to permit logging-in and logging-out of the driver from recorder 200 as well as transfer of prior driver activity to and from recorder 200, and duty status buttons 244 permitting the driver to manually change the driver's duty status, i.e., "on-duty driving," "off-duty," "on-duty, not driving," or "sleeper berth."

Front panel 240 has a self-test button 245 that allows the driver to initiate testing of the operability of recorder 200, and an indicator light 246, 248, such as an LED light, that indicates proper or improper operation of recorder 200 and/or the driver that is currently driving when team driving. Additional indicating lights 246 provide a visual indication of whether the driver's hours of service is in compliance or out-of-compliance with applicable hours of service regulations, for example, a red light indicates out-of-compliance, a green light indicates in-compliance, and a yellow light indicates that the driver is approaching the end of permitted driving time. Additionally or alternatively, compliance information can be conveyed to the driver audibly and/or on display screen 250. Front panel 240 also includes either or both of on-duty time remaining and a scrolling text message bar on display 250. Driver buttons 247 permit recorder 200 to switch the display between the drivers driving.

The front panel 240 of the driver interface includes optional biometric reading device(s) 242, 249, for example, a fingerprint recognition reader 242 and a camera 249. Recorder 200 also includes a wired data port 243, such as a USB port, to permit data transfer between the recorder 200 and other external devices or media, such as an electronic display (shown in FIG. 7).

Recorder 200 continuously obtains mileage from the vehicle mileage sensing system through a mileage sensing system interface 220, as well as mileage, engine use, miles driven, time and date obtained from the ECM through an ECM interface 225. Vehicle location (latitude and longitude), date, and time are input to recorder 200 from a global navigation satellite system, e.g., GPS, via a satellite interface 230 periodically, such as every fifteen minutes. In addition, a wireless data portal 235 is provided to permit the uploading and downloading of data from and to recorder 200.

On-board recorder 200 includes a back-up power supply 215, for example, an internal battery, processor 205, and a memory device 210. Primary power to on-board recorder 200 is provided by a connection to the vehicle battery. The processor 205 is, for example, a central processing unit (CPU) or a simpler data storage device utilizing encoded and encrypted instructions with processing capabilities in accordance with the available memory 210. The memory device 210 includes read and write capabilities and a variety of commercial, off the shelf memory media. The processor 205 and memory 210 collectively form the logic component of the recorder 200. Recorder 200 includes a display 250 for informing the driver of the remaining driving time permitted by the HOS laws or regulations, and for displaying relevant information to federal, national, state, provincial or local authorities, as discussed below.

Figure 3:
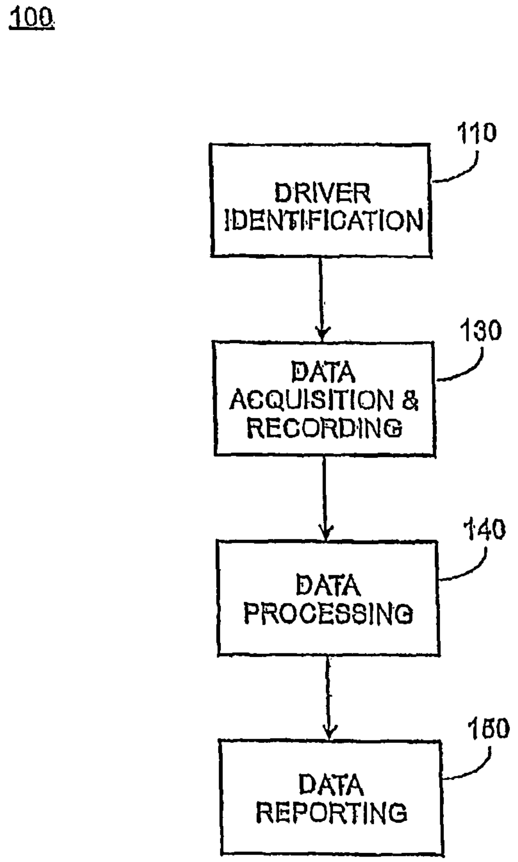
FIG. 3 is a flowchart of a system and method for logging and reporting driver and vehicle operating data.

Referring to FIG. 3, a process 100 for logging and reporting driver activity and vehicle operating data includes driver identification 110, data acquisition and recording 130, data processing 140, and data reporting 150. On-board recorder 200 is always powered on. Recorder 200 can automatically enter a "sleep mode" in which non-essential systems such as the display screen are powered down to conserve power, and the driver can awaken recorder 200 by pushing any key, or recorder 200 can be awakened by starting the vehicle or if the vehicle moves. The ability of the driver to cause the unit to go into sleep mode or to power-off can be limited or prevented. The identity of the driver is determined by the use of a unique driver ID, for example, a portable memory device issued to the operator and operable with a portable memory device reader 241, such as a smart card or contact memory button. The ability to start, move, or disable the vehicle can be controlled by or contingent upon an accurate identification of the driver.

Figure 4:
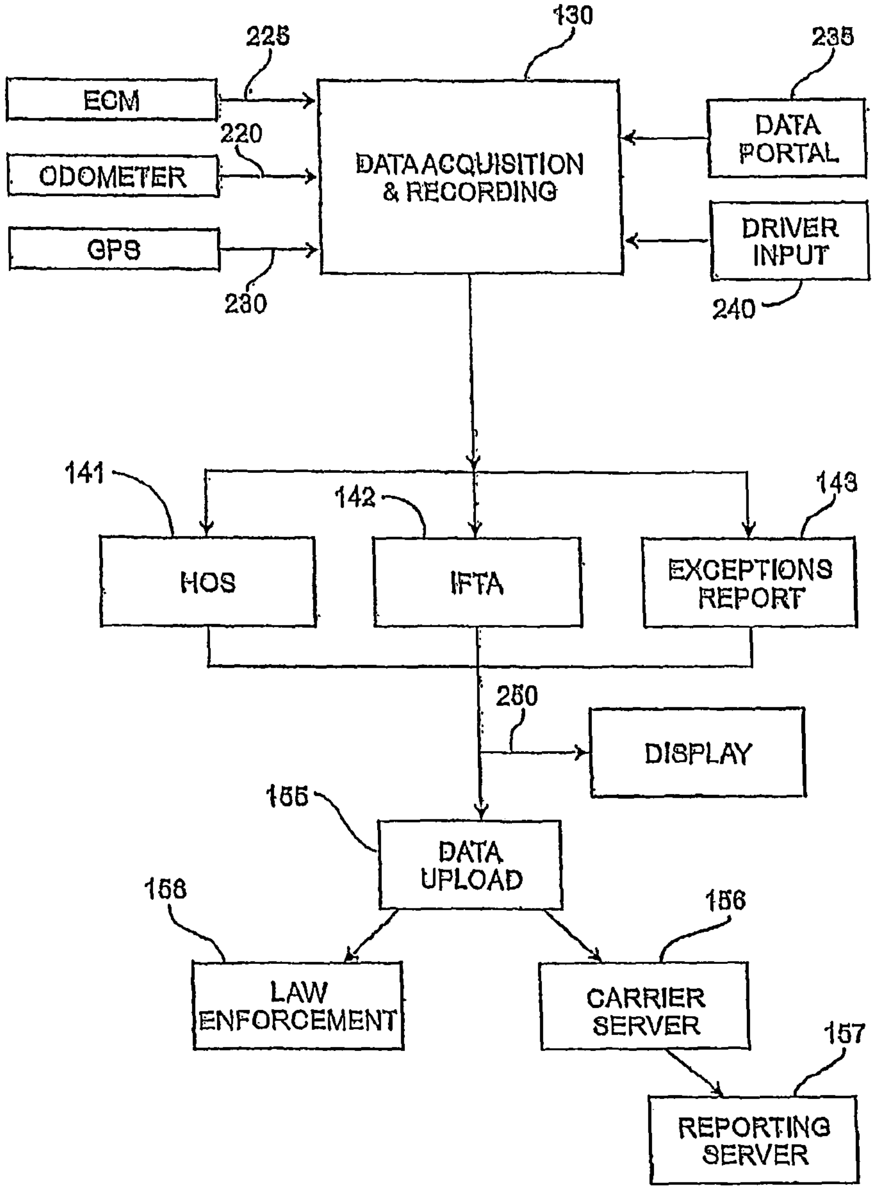
FIG. 4 is a flowchart of processing steps for logging and reporting driver and vehicle operating data.

Referring to FIG. 4, data acquisition and recording 130 encompasses acquiring data from the vehicle mileage sensing system, the vehicle ECM, GPS, driver input, and data portal 235. The on-board recorder 200 is connected to the ECM of the vehicle through a data bus, such as an SAE J1708, J1850 or J1939 data bus connected through the ECM interface 225. The data on the bus is translated into an RS232 signal via a commercial off-the-shelf data translator and fed into the on-board recorder processor 205 and memory 210. The vehicle mileage sensing system interface 220 is formed, for example, by hard-wiring on-board recorder 200 to the vehicle's magnetic speed sensor. Recorder 200 includes a Global Positioning System (GPS) receiver which forms satellite interface 230 and derives its input signal from an antenna located on the interior or exterior of the vehicle.

Mileage can be determined from only the ECM or through a broadcasting of an odometer reading from a vehicle dashboard, such as on a SAE J 1708 MID 140 bus. Alternatively, data received from the vehicle mileage sensing system, such as a speed sensor positioned at the transmission tail shaft of a vehicle can be automatically calibrated, for example, by comparing the data to mileage determined from GPS or through GPS mapping from a central server. The device can be automatically re-calibrated, by programming recorder 200 with the size and wear of the vehicle's tires and/or for different gear ratios. Recorder 200 can then provide the calibrated mileage to at least one of the odometer display and the ECM. Vehicle mileage can also be calibrated by using the GPS mapping at the central server and then sending the calibration back to the vehicle.

Recorder 200 automatically, continuously records the vehicle operating data as raw vehicle operating data obtained from the vehicle mileage sensing system and the ECM, and records GPS data at a set period time, for example, every fifteen minutes. GPS data can also be recorded upon the detection of a specific event, such as a change in duty status, or operating parameter, such as the engine being off for more than a specified period of time. To determine the hours of service, the driver's duty status throughout the day is also determined. Duty status includes driving-on duty, not driving-on duty, off duty, and sleeper berth. Each change in duty status can be manually input to recorder 200 by the driver using duty status buttons 244 and recorded with a time and date stamp obtained via GPS. Certain changes in duty status can also be determined automatically by recorder 200, as discussed below.

Data processing 140 creates an HOS log 141 and an IFTA log 142 from the raw data, and compares the HOS log to applicable regulations to determine whether the driver is in-compliance with HOS regulations. A more detailed exceptions report can be created from the comparison of the HOS log to applicable regulations that provide the detail of the comparison. In creating the HOS log, recorder 200 continuously calculates the-time the driver has been in each duty status over the course of a day. The HOS log includes the time per duty status for eight consecutive days, including a calculation of the total hours driven today, total hours on duty for the past seven days, and total hours on duty for the past eight days. The hours of service log is typically created from date, time, mileage and duty status.

In creating the IFTA log, at every acquisition of data from GPS, for example, every fifteen minutes, the miles driven over that time period are calculated from mileage data obtained from the vehicle mileage sensing system and/or ECM, and recorded with a location, time, and date stamp obtained from the GPS data. A fuel tax report is then created, preferably by an external server, such as the host server or a second server communicating with the host server, having the requisite software to create a report in compliance with IFTA regulations, from the IFTA log and any required fuel purchase information.

Data processing 140 can also include an automatic determination of change in duty status from off-duty to driving on-duty. By recording the time when the vehicle starts to move, as determined by the ECM indicating engine use, i.e., that the vehicle has been started, and by the vehicle mileage sensing system or ECM indicating motion, recorder 200 automatically records a change of duty status to driving-on duty at that time. By recording the time when the engine is turned off for a predetermined period, such as four minutes, recorder 200 automatically prompts the driver to input a change of duty status to not driving-on duty, off duty, or sleeper berth. Also, by recording the time when the engine remains on but the vehicle is not moving (determined from, for example, either a speed of zero obtained from the ECM or there being no change in mileage) for a predetermined period, such as four minutes, recorder 200 can automatically prompt the driver to input a change of duty status to not driving-on duty, off duty, or sleeper berth. Off duty status is automatically determined at the time the driver logs out from recorder 200, for example, by removing the smart card from smart card reader 241. Alternatively, the driver can use the keys to indicate off-duty status while leaving the card in the reader.

Data reporting 150 includes using recorder 200 to provide information to the driver, as discussed above, displaying on display device 250 the hours of service log and compliance status, with display 250 and indicator lights 246. An additional display tablet can be connected to recorder 200 to display the hours of service log in grid form. For example, operator's total hours driven today, total hours on duty today, total miles driven today, total hours on duty for seven days, total hours on duty for eight days, and the operator's changes in duty status and the times the changes occurred are displayed.

Data reporting 150 also encompasses the ability of system 100 to automatically upload the hours of service log and the fuel tax log to a receiver external to the vehicle using a wireless telecommunications network. Recorder 200 also emits, such as periodically or continuously, a signal representative of the compliance status to a second receiver external to the vehicle and under control of authorities, such as law enforcement, carrier management, regulatory agencies or other approved inspector or agent. In addition, the compliance status, HOS logs or a more detailed exceptions report can be uploaded to a second receiver external to the vehicle when recorder 200 is queried.

Recorder 200 is configured to automatically attempt to transmit data to a host server via the wireless telecommunications network's off-peak hours, e.g., at a pre-determined period of time (e.g., 1:00 am-5:00 am) that is selected because it is available at low cost. A wireless telecommunications network made up of pager networks, cell phone networks and wide area networks provides low cost options. Other options are an infrared connection, a radio connection, and a satellite connection. Recorder 200 is programmed to seek a single wireless telecommunications network to upload data to a host server. Alternatively, recorder 200 can be programmed to seek various wireless telecommunications networks to upload data to a host server, from the least cost to the next most expensive cost and so on until the device finds such a data link and uploads its data. If after a predetermined time period for performing an upload, such as fourteen days, upload has not been successful, each day's HOS log, and IFTA log, and alternatively an exceptions report as well, can be uploaded whenever the recorder comes into contact with the predetermined method of uploading data, or can be uploaded over a satellite connection. Data is stored on recorder 200 for not less than 14 consecutive days and is organized by driver for hours of service purposes and/or by vehicle for fuel tax reporting purposes.

By continuously emitting a signal indicating the compliance status of the driver, recorder 200 provides a way whereby authorized federal, state or local officials can immediately check the status of a driver's hours of service. Authorities receive this signal whenever the vehicle is within a predetermined range of the second receiver located, for example in a hand-held device, law enforcement vehicle, weigh station, or along a highway. The entire hours of service log can be displayed on recorder 200 or on an electronic display or tablet connected thereto, or downloaded, when recorder 200 is queried. Data can be downloaded to law enforcement personnel using a receiver tied to a computer, for example; in the law enforcement vehicle, that wirelessly interrogates recorder 200 and displays the data, by using a handheld device in the possession of a law enforcement officer that wirelessly interrogates recorder 200 and displays the data, or by using a wired connection through a port inside or outside of the vehicle.

The capability can also be provided to download information from a host server to the recorder. For example, using the communication link by which data is downloaded to the host server, the host server can also communicate data to recorder 200 at the end of the daily upload cycle. Data transmitted can include driver regime, such as 7 day/60 hour or 8 day/70 hour regime. The host server can also communicate with recorder 200 as desired via a wireless telecommunications network to ascertain information, such as compliance status, location as of the last GPS recording and remaining HOS.

Figure 5:
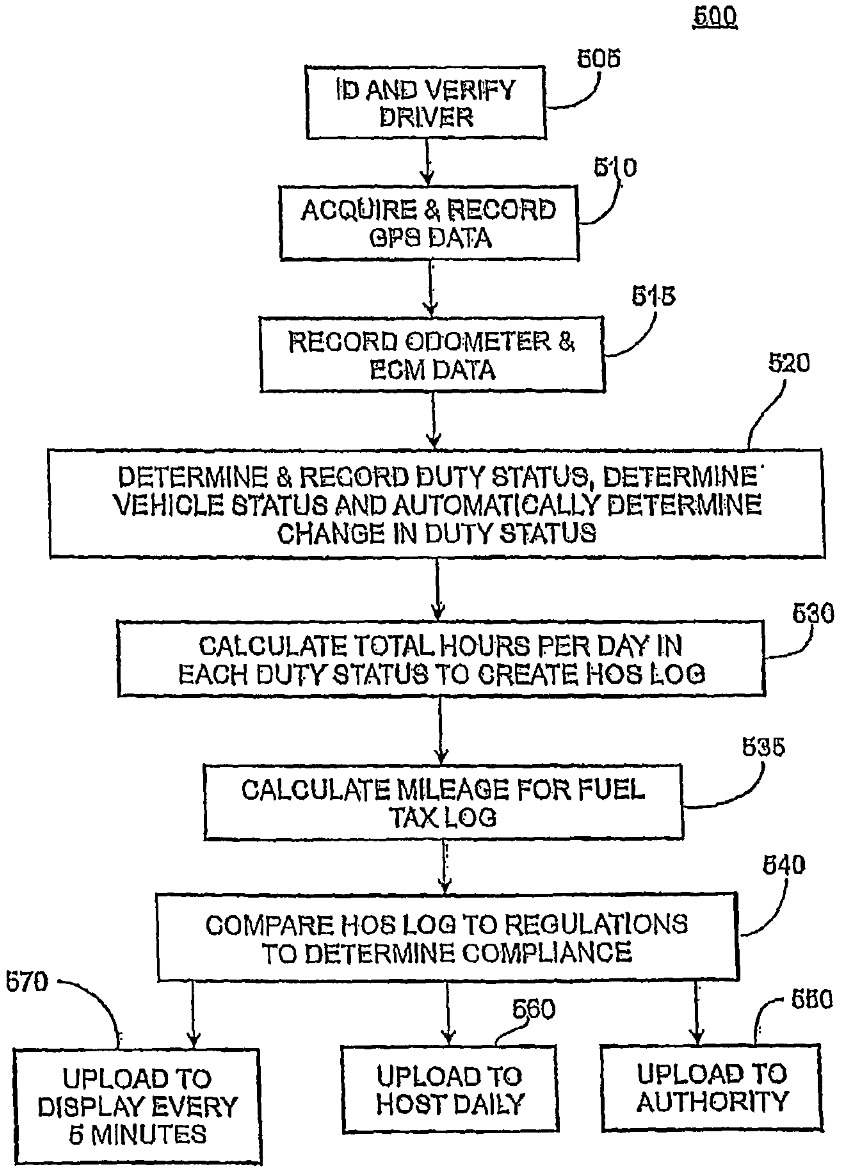
FIG. 5 is a flowchart of processing steps for logging and reporting driver and vehicle operating data.

Referring to FIG. 5, the overall process includes driver and vehicle identification and verification 505, acquiring and recording GPS data at pre-determined intervals, for example, every 15 minutes 510, acquiring mileage and ECM data, for example, continuously, recording mileage and ECM data, for example, at least every 15 minutes, 515, determining duty status from driver input and/or automatically and recording duty status 520, calculating total hours per day in each duty status to create an HOS log 530, recording latitude and longitude for fuel tax reporting 535, comparing the HOS log to regulations to determine compliance, uploading compliance status or a detailed exceptions reportto federal, national, state, provincial or local authorities 550 continuously, periodically or upon receipt of authority's or driver request, uploading to the host server 560, for example, daily, and uploading to the recorder display 570, for example, every five minutes.

Recorder 200 automatically records data formatted to meet home country legal requirements and country of operation legal requirements. For example, a driver whose home country is Mexico, may operate a vehicle over a period of time in the United States. The operation of the vehicle within these countries, and their respective states, provincial or local jurisdictions triggers different reporting requirements to comply with respective HOS laws or regulations. Recorder 200 simultaneously records hours of service and/or fuel tax information that is country-specific, such as for the United States, Canada, and Mexico, and has multi-lingual reporting capability, such as English, French and/or Spanish.

Figure 6:
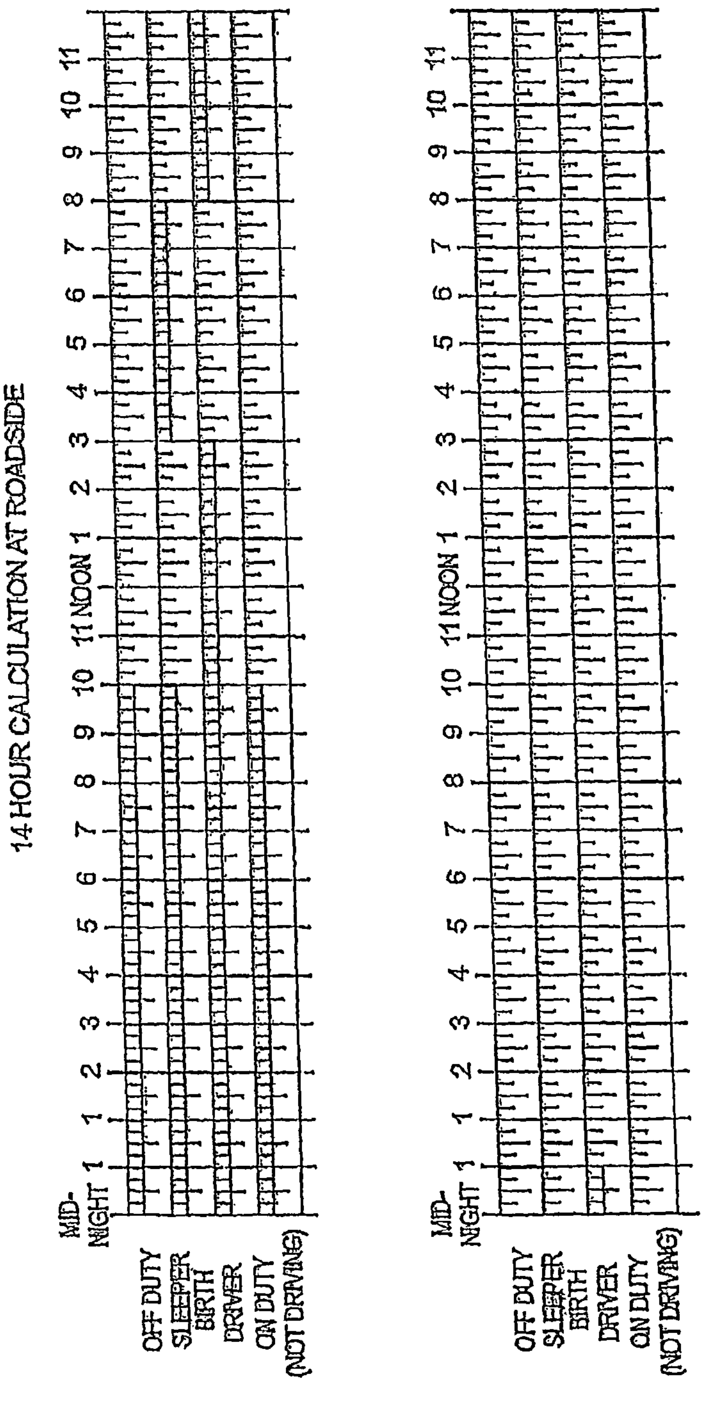
FIG. 6 is a graphical view of an hours-of-service log generated by the on-board recorder.

As seen in FIG. 6, a graphical representation of an hours of service log includes duty status (off-duty, sleeper berth, driving, and on duty-not driving) on the vertical axis, and hours of the day on the horizontal axis. The log line indicates each change in duty status, the time the change occurred, and the hours within each duty status between changes. In the example shown for Day 1, the driver was in "off duty" status for 10 hours (midnight to 10 am on Day 1), followed by five hours of on "duty-driving" (10 am to 3 pm on Day 1), followed by a "sleeper berth" period of five hours (3 pm to 8 pm). The driver was then back on duty "driving" for another five hours (8 pm to 1 am on Day 2) when the driver was pulled over for a routine roadside inspection or weigh station. In this situation, the driver was in compliance with the hours of service regulations. Accordingly, a signal representing a compliance status (in-compliance state) would have been emitted by the on-board recorder during the inspection. The law enforcement officer would have known before inspecting the hours of service log shown in FIG. 6 that the driver was already in compliance.

Figure 7:
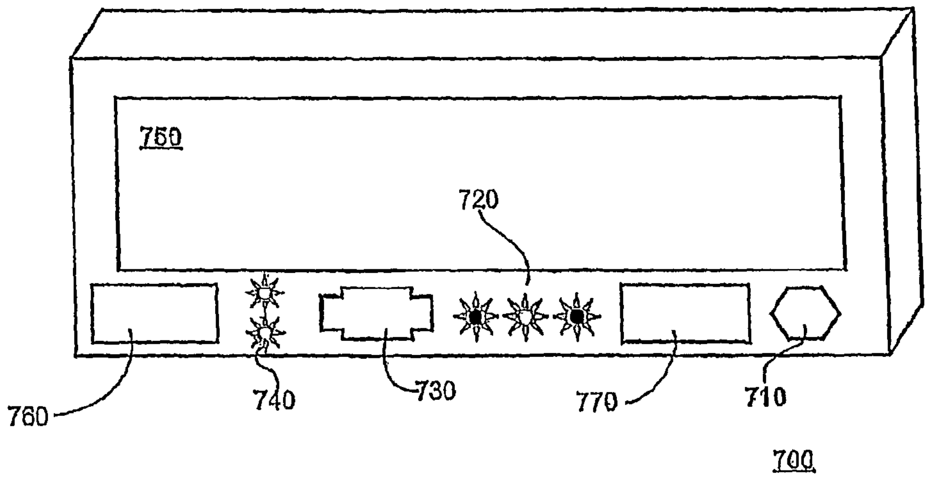
FIG. 7 is a front view of a display external to the recorder.

A complete display of an hours of service log can provide eight such graphical representations, one for each of the eight days, and a summary of the total hours driven today, total hours on duty for seven days and total hours on duty for eight days. As seen in FIG. 7. the hours of service log shown in FIG. 6 can be displayed separately from recorder 200. For example, an external display device 700 is connected to recorder 200 to provide a more detailed review of recorded data. External display device 700, such as an electronic tablet connected wirelessly or through a wired connection such as a USB connection with recorder 200, has a relatively large display 750 for viewing detailed HOS logs (see FIG. 6) that are not as easily viewed on the display 250 of recorder 200. The external display device 700 includes a device functioning indicator 710, compliance status indicators 720, a home or operating country selector 730, driver selectors or indicators 740, a duty status selector 760 and a data transmission port 770, such as a USB connection or wireless transceiver for wirelessly communicating with recorder 200.

Figure 8:
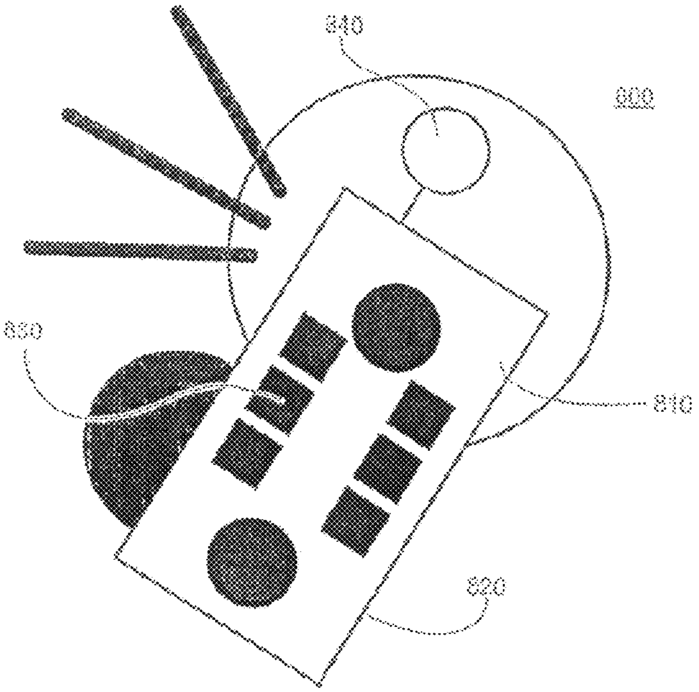
FIG. 8 is a schematic view of a device for receiving a signal indicating compliance status of a driver or vehicle.

Referring to FIG. 8, a device 800 for receiving a signal indicating a compliance status of a driver or vehicle has an "in-compliance" indicator 810, an "out-of-compliance" indicator 820, an input/keypad 830, and a receiver 840 for receiving emitted compliance status signals from nearby recorders 200. Device 800 can be powered from a law enforcement officer's vehicle (such as plugged into a cigarette lighter), or battery, and can be a handheld device that is used to monitor passing and nearby vehicles for HOS compliance status. Recorder 200 can have a short range RF transmitter which broadcasts the driver's HOS compliance status, electronic vehicle license plate, drivers risk factor based oh past records, etc. The receiver can be an RF receiver distributed to state, local, and federal authorities providing snapshot monitoring of the status of drivers (HOS compliant or non-compliant), high risk drivers and vehicles at toll gates and border crossings.

A number of embodiments of the invention have been described. Nevertheless, it will be understood that various modifications may be made without departing from the spirit and scope of the invention. For example, the on-board recorder may be configured to include one or more of the following features.

Recorder 200 can include a biometric reader for verifying the identity of the driver using, for example, facial, retinal or thumbprint recognition. The identity data is compared to a database within recorder 200 to verify the identity of the driver by matching the biometric with a specific driver. The unique driver ID can be a Transportation Worker Identification Card (TWIC) currently being developed by the Transportation Security Administration (TSA) or a commercial driver's license (CDL) issued by various state or federal governments. The vehicle can be disabled if the identity of the driver cannot be verified after some predetermined time.

Camera 249 can be a miniature camera, such as with IR lighting for night driving, positioned on the front face of recorder 200 for visual analyzing the driver. The camera is used to identify the driver and visually tie the driver to the HOS data. Facial recognition, retinal or IRIS mapping, and driver behavior can be periodically assessed such as for drowsy driver syndrome from the recorder or an external source, such as through an external host server. The digital camera feature can be used for gate authorization by sending the drivers' ID and photograph ahead to a destination, such as a shipping dock or border crossing. The camera feature can be used for on-board documentation to the central server. Once the vehicle is in the non-moving and park mode the digital camera can also be used as a FAX/Scanner.

The portable memory device carried by the driver, for example, the smart card or contact memory button (such as the IBUTTON™ available from Dallas Semiconductor Corp.), can be configured to retain driver identity data, driving regime (such as, 7 day or 8 day regime), and the driver's hours of service log such that this information is automatically downloaded from the portable memory device to recorder 200 whenever a driver logs into a vehicle. In this way, the driver's hours of service log and related information can be transferred from one vehicle to another as the driver changes vehicle. Such data can also be downloaded into recorder 200 from the fleet carrier via several methods, for example, a wired connection at the fleet terminal, a wireless connection at the fleet terminal and/or a wireless download at any location within the range of a wireless telecommunications network. The portable memory device can include a programmable logic controller, such as an electrically erasable, programmable, read-only memory (EEPROM) of flash EEPROM.

Additional information that can be stored on the portable memory device includes the driver's current driving regime, the commercial driver license number (CDL #), commercial driver endorsements (e.g., HAZMAT), traffic violations and high risk driver data (e.g., DWI convictions). Transactions such as the last vehicle driven can also be stored on the driver card. Portable memory device technology, such as the IBUTTON™, can be used to transfer fuel purchase information about the vehicle and/or driver to a fuel pump and/or from the fuel pump to recorder 200. Alternatively, or in combination, infrared and RFID technology can be used to transfer data to and from recorder 200 to a user ID card or other external data source.

Recorder 200 can separately record each driver's duty status when more than one driver is driving the vehicle, for example team driving. While the hours of service for a particular driver are transferred, for example, by a wireless telecommunications network connection or portable memory device, when the driver moves to a new vehicle, the IFTA logs, which are vehicle dependent, remain with the recorder on the old vehicle.

IFTA reports identify the miles driven in each jurisdiction. Border crossings, for example, between states, countries, and provinces, can be determined by the driver inputting to recorder 200 when a border is crossed, by mapping software on an external server, or by mapping software on recorder 200. Recorder 200 can emit a signal indicating whether the recorder is present and thus recording data for compliance with applicable IFTA laws or regulations, and can emit safety related information such as tire pressure.

For each change of duty status, whether input manually or determined automatically, location as determined by GPS can be recorded. If a vehicle is equipped with an Intelligent Dash Board with speedometer, on dash odometer and fuel gage 225, data can be collected by recorder 200 from the Intelligent Dash Board rather than through the vehicle mileage sensing system interface 220.

The data processing 140 and data reporting 150 sections can also provide the capability of data encryption to ensure data integrity and to prevent tampering by the vehicle operator. However, the driver and/or carrier can be permitted to modify the operating data, and the processor includes a track changes function that records any alterations of operating data. Recording 200 can also provide the capability of authenticating the recipient of data such that data is only available to authorized users.

Recorder 200 can prompt the driver to review and verify that all entries are accurate prior to uploading data to the carrier. Recorder 200 can further prompt the driver to certify that all entries made by the driver are true and correct or that recorder 200 is operating properly. If recorder 200 malfunctions, the recorder can notify the driver visually, audibly and/or using a text message, prompt the driver to revert to a paper log, and/or emit an out-of-compliance signal. If recorder 200 determines that the vehicle is moving but no driver is logged on, a visual/audio/or text warning is provided to the driver signaling that the driver is not logged-in, and an out-of-compliance signal is emitted. Recorder 200 can also warn the driver when the driver is approaching the maximum limitations established by the hours of service laws or regulations. Recorder 200 can also upload such a warning to the carrier.

To limit "double counting," whereby a driver uses a paper log book when recorder 200 is on-board, recorder 200 can emit a signal indicating that recorder 200 is on-board the vehicle. Recorder 200 has logic built in to account for, for example, gaps in miles or time to ensure the driver does not tamper with recorder 200, such as by disconnecting the power source, pulling a fuse, or similar tampering.

Recorder 200 continually or periodically performs self-testing and can prompt the driver to troubleshoot for system errors and system rebooting. Recorder 200 can self-test upon demand from law enforcement.

WIFI™ or BLUETOOTH™ technology can be utilized to facilitate data transfer and/or permit the communication of many different devices to form a communication network. BLUETOOTH™ technology can be used to permit the downloading of fuel purchase information to recorder 200 and/or as the communication protocol for the recorder itself in communications with law enforcement or any other data transfer.

Recorder 200 can have a short range RF transmitter which broadcasts the driver's HOS compliance status, electronic vehicle license plate, driver's risk factor based on past records, etc. The receiver can be an RF receiver distributed to state, local, and federal authorities for a snapshot monitoring status of drivers (HOS compliant or non compliant) high risk drivers and vehicles at toll gates and border crossings, and for Homeland Security purposes generally. The receiver can plug into the cigarette lighter of the law enforcement vehicle, similar power source or be positioned within a handheld device. A non-compliant driver can be identified by recorder 200 emitting short range signals, such as 315 MHZ or 434 MHZ (approximately 200 ft) RF signals, which can be detected by authorities. The receiver held by authorities can be a 315 MHZ or 434 MHZ RF device. The data exchange is dependent upon an authentication process, whereby only authorized users (the authorities) can access the data. The authorities can then be alerted while driving past a vehicle on the highway or when sitting along an interstate and monitoring for violators. Once a violation has been detected the authorities can obtain a detailed log from the recorder via a hard connection or a wireless connection, such as BLUETOOTH™ OR WIFI™ adapter in the USB data port of recorder 200. Also the non compliant driver status can be broadcasted on the SAE J 1708/1587 data bus and the RS-232 port from the recorder. As another method the RS-232 and/or SAE J1708 data can allow existing telecommunication products on the vehicle such as QUALCOMM™, XATA™ and PEOPLENET™ to transmit the driver log report status. Also, as another method the RS232, SAE J1708 or USB data port can allow the driver logs to be downloaded via WIFI™ or BLUETOOTH™ adapters or devices at WIFI™ hot spots at truck stops, for example, SIRICOMM™ has incorporated WIFI™ hot spots at Pilot Service Centers, and WIFI™ Hot(s) Networks are planned at weigh stations, toll gates, and Fleet Terminals.

Vehicles emitting an in-compliance signal can pass through a checkpoint or roadside inspection without further delay and those that are not in-compliance can be stopped for further investigation. Recorder 200 can be queried to generate a driver's hours of service graph and display the graph, for example, on a display tablet that can be connected to recorder 200. Electronic tablet 700 can be equipped with a rechargeable battery, such as a NiCd battery or a standard NiCad battery pack used on video cameras. The electronic tablet device 700 can include an antenna for all types of wireless communication and a connection permitting wired communication. The electronic tablet 700 can include a USB port so that printers and other devices can communicate to the electronic table 700. The recorder can be provided with a USB Port to form a direct, non-wireless connection to the tablet.

Recorder 200 can also be provided with the option of detecting whether or not a trailer is tethered to the vehicle. If tethered, recorder 200 connects to a PLC chip located in the trailer from the ABS Trailer Module that contains the trailer's ID number and related data and a PLC receiver chip located in the recorder. The trailer ID information can be obtained from various sources, for example, via a PLC4Trucks power line communications, such as defined in SAE J2497. If the fleet operator wants to locate that particular trailer it can access the PLC network chip via cell or pager network, or via satellite, through recorder 200.

The Recorder 200 can be equipped with a Tractor PLC ID transmitter chip and the driver log information can be downloaded from a Trailer Tracking System, such as TERION™, using a SAE J 2497 power line communication protocol. This method allows the driver's log report along with a tractor ID to be sent through an existing power line, for example, using a standard SAE J560 tractor/trailer connector and SAE J2497 protocol to a trailer communication wireless product.

Accordingly, other embodiments are within the scope of the following claims.

We claim:

1. The method for data communication between a vehicle and fuel pump, comprising:

identifying a driver of a vehicle;

recording a duty status of the driver;

creating an hours of service log comprising data selected from a group consisting of a change in duty status of the driver; time and date the change occurred; hours within each duty status; total hours driven in a single day; total hours on duty for a seven day period; and total hours on duty for an eight day period;

automatically uploading the hours of service log to a receiver external to the vehicle using a wireless telecommunications network;

recording vehicle operating data with an onboard electronic device, the onboard electronic device being operatively connected to at least one of a data bus of the vehicle, a vehicle mileage sensing system, and a global navigation satellite system;

the vehicle operating data being selected from a group consisting of vehicle mileage; vehicle location data; engine use, time, and date; and vehicle identification information; and transmitting the vehicle operating data from the onboard electronic device to the fuel pump.

2. The method for data communication according to claim 1, and comprising acquiring the vehicle operating data from an onboard vehicle data source.

3. The method for vehicle data communication according to claim 1, wherein the vehicle data bus comprises at least one of a group consisting of RS232, SAE J1708, SAE J1850, SAE J1939, and SAE J2497.

4. The method for vehicle data communication according to claim 1, and comprising communicating fuel purchase information from the fuel pump to the vehicle's onboard recorder.

5. The method for vehicle data communication according to claim 1, and comprising transmitting fuel purchase information to an external computing device remote from the vehicle.

6. The method for vehicle data communication according to claim 5, wherein the external computing device comprises a handheld device.

7. The method for vehicle data communication according to claim 5, wherein the external computing device comprises a host server.

8. The method for vehicle data communication according to claim 5, wherein the external computing device comprises an electronic tablet.

9. The method for vehicle data communication according to claim 1, and comprising acquiring vehicle mileage data from at least one of the vehicle mileage sensing system and a vehicle engine control module, and storing the vehicle mileage data on the onboard recorder for subsequent reporting.

10. The method for vehicle data communication according to claim 9, wherein the vehicle mileage sensing system includes a speed sensor and a vehicle odometer.

11. The method for vehicle data communication according to claim 1, and comprising acquiring vehicle location data via a Global Positioning System, and storing the location data on the onboard recorder for subsequent reporting.

12. The method for vehicle data communication according to claim 1, further comprising downloading to the vehicle onboard recorder driver related data from a wireless communication network, the driver related data comprising biometric data selected from a group consisting of facial, retinal, and thumb print identifiers.

13. The method for vehicle data communication according to claim 12, and comprising reading biometric data of the driver and matching the data read to the biometric data stored in the vehicle onboard recorder to verify the identity of the driver.

14. The method for vehicle data communication according to claim 1, and comprising utilizing RFID technology to transfer data from the vehicle to an external source.

15. The method for vehicle data communication according to claim 1, and comprising utilizing a digital camera to identify a driver of the vehicle.

* * * * *